May 9, 1944.                B. Q. JONES                2,348,217
                             HAMMOCK
                       Filed July 18, 1941          2 Sheets-Sheet 1
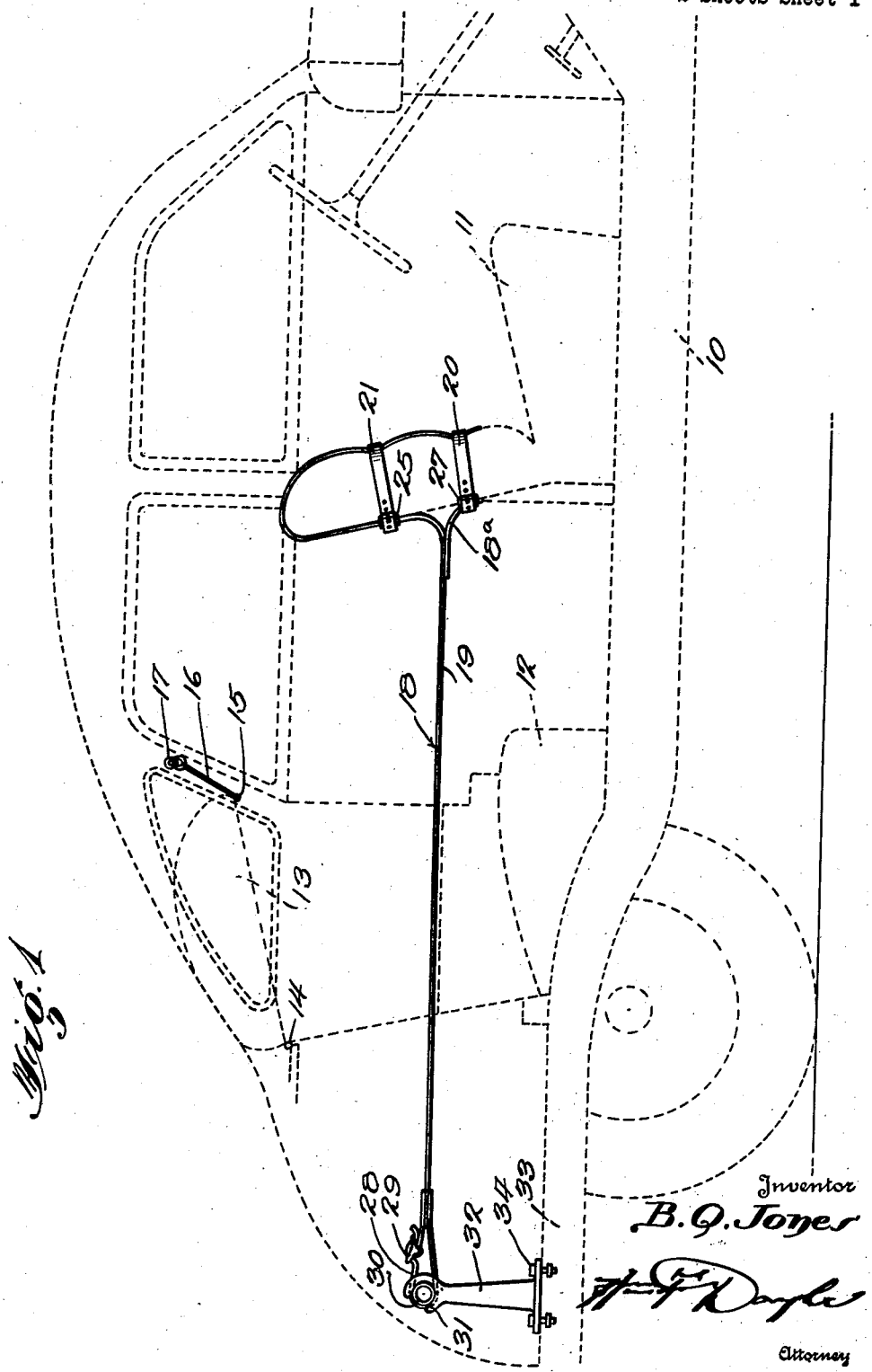

May 9, 1944.  B. Q. JONES  2,348,217
HAMMOCK
Filed July 18, 1941  2 Sheets-Sheet 2
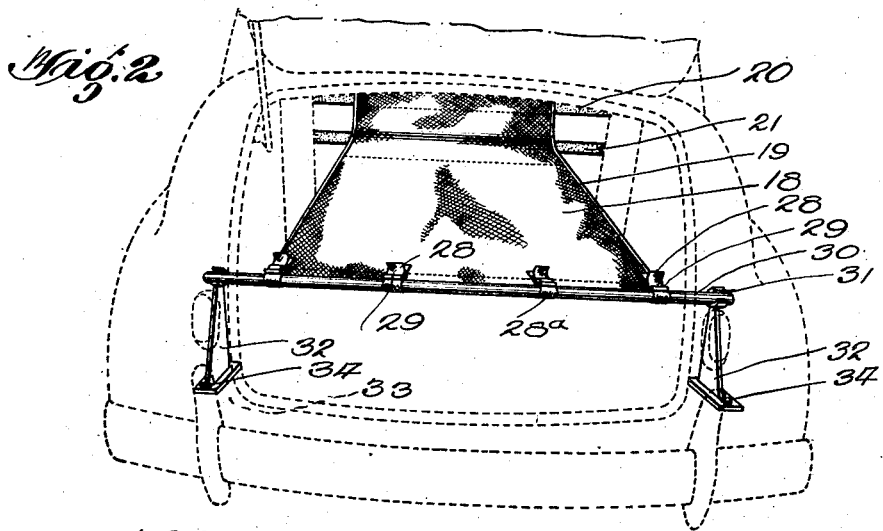
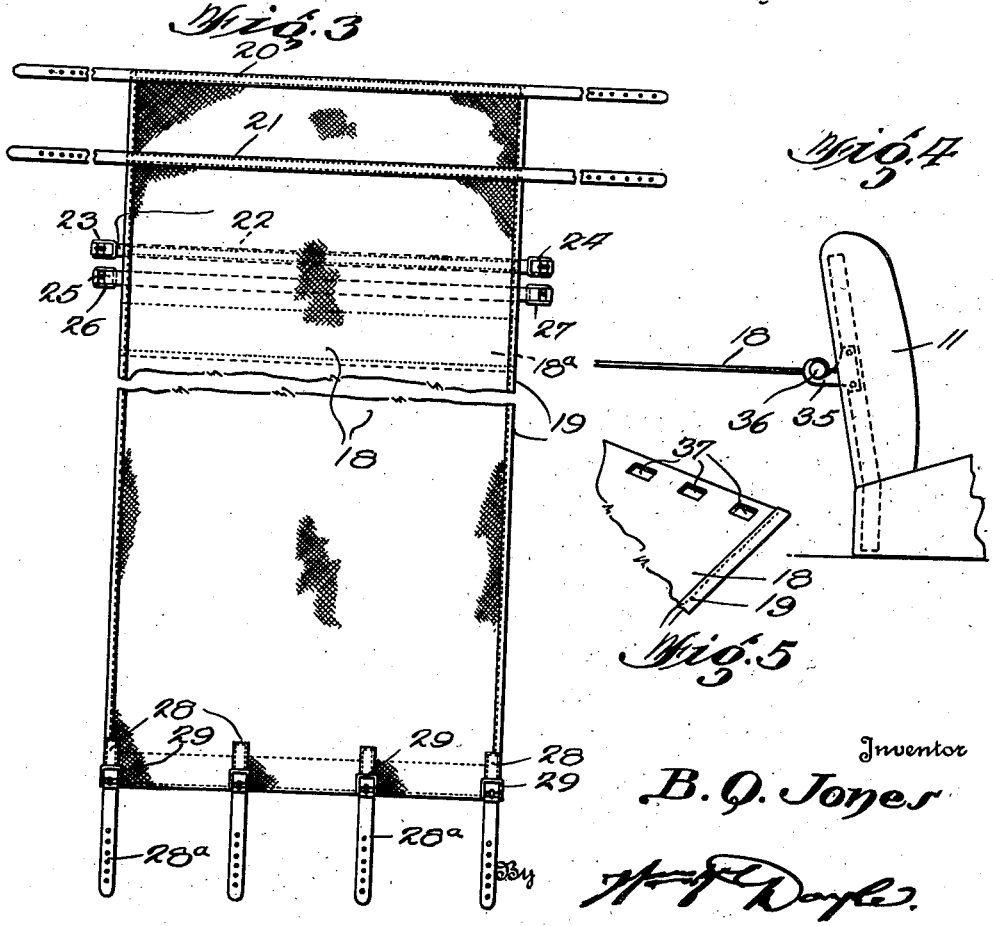
Inventor
B. Q. Jones Patented May 9, 1944

2,348,217

UNITED STATES PATENT OFFICE 2,348,217

HAMMOCK

Byron Quinby Jones, United States Army

Application July 18, 1941, Serial No. 402,933

4 Claims. (Cl. 5—118)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to and has for a purpose the provision of a hammock particularly adapted for use in motor vehicles, and is especially adapted to provide a cheap and easy means for utilizing the available space in motor vehicles as a bed for resting and sleeping or for the emergency transportation of sick and injured persons.

The particular object of this invention is to provide a hammock which is cheap and easy to make, which is adapted to be easily and quickly mounted in a motor vehicle with a minimum change in structure of said vehicle.

Another object of this invention is the conversion of the usual modern passenger car, having a built-in rear luggage compartment, to one having a comfortable bed-hammock by very simple and economical means, requiring practically no change in the vehicle.

Another object of this invention is to provide means whereby the passenger car can be returned to normal condition for general use with no difficulty since the invention embraces no additional parts that will occupy space which would prevent the ordinary use of the car.

Another object of this invention is to provide an undisturbed front seat for the operator and one or two other persons while the hammock is in use.

Another object of this invention is to provide a full length double-width bed in the rear of the front seat.

Another object of this invention is to provide means whereby the back of the rear seat may be swung upward into a horizontal position, and means for securing the back so that it will not interfere with the hammock while it is in use.

Another object of this invention is to leave the seat portion of the rear seat undisturbed in any way.

A further object of this invention is to provide by the usual means access to the hammock from the rear or from either side of the vehicle.

With the above, and other objects and advantages in view, the invention consists of features of construction, arrangement and operation of parts which will appear in the specification and be finally pointed out in the claims.

While the preferred embodiment of the invention is shown, it will be understood that slight changes in form and minor details of construction may be resorted to without departing from the spirit of the invention and fall beyond the scope of the claims.

Referring now to the drawings in which similar characters and references in the several figures indicate identical parts;

Fig. 1 is a vertical, longitudinal section of the car from the cowl back, represented in dotted lines, showing the preferred manner for attaching the invention to the car.

Fig. 2 is a rear elevation of the car, also represented in dotted lines, showing the manner in which the invention is attached and also showing the luggage door in raised position.

Fig. 3 is a top plan view of the preferred embodiment of the invention.

Fig. 4 is a modification of the invention showing modified means for attaching the hammock to the rear of the structural elements of the front seat.

Fig. 5 is a fragmentary view of the forward end of the hammock, showing openings through which a bar can be interlaced, said bar being adapted to be entered into the hooks shown in the modified view in Fig. 4.

Reference now being had to the drawings by numerals, 10 indicates the conventional motor vehicle having the usual front seat 11 and rear seat 12, having a back 13 which is hinged at its upper rear end by means of a hinge 14. Attached to the lower rear ends of the back 13 are screw eyes 15 adapted to receive elongated hooks 16 which are pivotally secured to the frame of the motor vehicle at 17. The hammock consists of strips of canvas 18 and 18—a, which are bound on their outer longitudinal edges by the usual binding 19. Strip 18 is the body or web of the hammock and has attached at its forward end crosswise straps 20, 21 and 22. Strap 22 has buckles 23 and 24 secured to its opposite ends. Buckles 23 and 24 are adapted to receive the ends of strap 21, as shown. Strip 18—a is a flap secured across the body 18 at some distance from the forward end of the body. The flap has attached at its forward end a crosswise strap 25. Strap 25 has buckles 26 and 27 secured to its opposite ends. Buckles 26 and 27 are adapted to receive the ends of strap 20, as shown, whereby the hammock is adapted to be secured to the back of the front seat 11.

Secured to the opposite ends of the canvas 18 are four end straps 28, having end buckles 29 secured thereto, which are adapted to receive other end straps 28—a. The four end straps 28—a are adapted to be strapped to cross bar 30, which rests in slots 31 of supports 32, which are bolted to the floor 33 of the luggage compartment of the vehicle 10 by means of bolts 34. It is apparent from the drawing that the tension placed upon the canvas 18 by means of end-straps 28—a through end buckles 29 will keep the cross bar 30 securely in place in slots 31 but that as soon as the tension is released cross bar 30 can be easily removed from the slots 31.

Referring now more especially to Fig. 2, in which is shown the convenience by which a sick or injured person can be moved into the car from the rear and placed upon the bed or hammock, thus providing an emergency means of conveying a sick or injured person to medical aid by the mere expedient of raising the usual luggage door of the conventional motor vehicle.

The operation of the preferred embodiment of the invention is easily understood; however, to go more fully into detail, the end of the canvas 18 is laid over the top of the back of the front seat 11 and strapped in position by means of the cross straps 20, etc., and cross buckles 24, etc., which pass around the sides of the back of the front seat and are buckled together. A gap or fullness may be provided in the canvas material, where it goes over the back of the front seat, so that the canvas can be adjusted upwardly and downwardly, thereby changing the head or forward portion of the hammock to carry an individual in a more or less horizontal position. This gap in the material is provided for the reason that the seat and back of all motor vehicles are not conventional, since some are higher than others and, in applying the hammock to the seat back, unless the gap is provided it will be found that the level of the hammock would slant either upwardly or downwardly and be uncomfortable. Therefore, means had to be provided whereby an adjustment of the head portion could be made, and the gap previously referred to is provided so that the hammock can be adjusted and placed in a comfortable position for the occupant thereof.

The opposite end of the canvas 18 is strapped to cross bar 30 by means of end straps 28—a and end buckles 29 and by means of these end straps and buckles the canvas 18 can be stretched lengthwise as desired and the hammock is ready for use.

Referring now to the modified view shown in Fig. 4, in which 11 indicates the front seat of the motor vehicle, the usual frame being shown in dotted lines to which is secured by means or rivets a hook member 35, a like hook member is also provided on the opposite side of the seat, so that the ends of the cross bar 36 can be received therein. This provides a further means for attaching the hammock to the front seat of the motor vehicle.

In Fig. 5 openings 37 are placed in the forward end of the canvas 18 so that the cross bar 36 can be secured thereto by interlacing said bar through the openings 37. The operation of the modified device is similar except for the manner in which it is attached to the front seat and can as easily be removed and stored in some convenient place in the motor vehicle as the preferred embodiment of the invention.

The invention exemplifies a hammock which makes available otherwise unused car space for camping and bivouac, and provides an emergency means of transporting the sick and injured and does this in a simple and yet expedient manner.

The invention is not to be understood as restricted to the details set forth, since these may be modified within the scope of the appended claims without departing from the spirit and scope of the invention.

Having thus described the invention, what is claimed as new and desired to secure by Letters Patent is:

1. A vehicle having front and rear seats with backs and having a floor area behind the rear seat, the back of the rear seat being separable from the body thereof, a cross member supported horizontally on said area and transversely of the vehicle at substantially the level of the rear seat body, and a hammock including a web having means at its ends for attachment to said cross member and to the back of said front seat.

2. A vehicle having front and rear seats with backs and having a floor area behind the rear seat, the back of the rear seat being separable from the body thereof and pivotally suspended from the body of the vehicle, a cross member supported horizontally on said area and transversely of the vehicle at substantially the level of the rear seat body, and a hammock including a web having means at its ends for attachment to said cross member and to the back of said front seat.

3. A hammock comprising an elongated body strip, a strap secured across said strip near one end thereof and having its ends projecting beyond the longitudinal edges of the strip, a pair of buckles secured to said edges at a greater distance from said end of the strip and adapted to receive said projected ends of said strap, whereby said strip may be laid over the back of the seat to dispose said strap and buckles at opposite surfaces of said back, and means at the other end of said strip for attachment to a support.

4. A hammock comprising an elongated body strip, a strap secured across said strip near one end thereof and having its ends projecting beyond the longitudinal edges of the strip, a pair of buckles secured to said edges at a greater distance from said end of the strip and adapted to receive said projected ends of said strap, a flap secured across said strip at a still greater distance from said end of the strip, another strap secured across said strip and having its ends projecting beyond the longitudinal edges of the strip, another pair of buckles secured to the longitudinally disposed edges of said strip and adapted to receive the ends of the last named strap, whereby said strip may be laid over the back of a seat to dispose said strap and said buckles respectively at opposite surfaces of said back and in position for securing the straps in the buckles, and means at the other end of said strip for attachment to a support.

BYRON QUINBY JONES.